United States Patent
Liu et al.

(10) Patent No.: US 8,593,761 B1
(45) Date of Patent: Nov. 26, 2013

(54) VERTICAL COIL (VC) DESIGN FOR SHORT YOKE LENGTH PERPENDICULAR MAGNETIC RECORDING (PMR) WRITER

(71) Applicant: Headway Technologies, Inc., Milpitas, CA (US)

(72) Inventors: Yue Liu, Fremont, CA (US); Jiun-Ting Lee, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/736,117

(22) Filed: Jan. 8, 2013

(51) Int. Cl.
*G11B 5/147* (2006.01)

(52) U.S. Cl.
USPC .................................................... 360/123.06

(58) Field of Classification Search
USPC .................................................... 360/123.06
See application file for complete search history.

(56) References Cited

U.S. PATENT DOCUMENTS

| | | | |
|---|---|---|---|
| 6,477,007 B1 | 11/2002 | Shukh et al. | |
| 6,876,518 B2 | 4/2005 | Khizroev et al. | |
| 7,102,854 B2 | 9/2006 | Wang et al. | |
| 7,505,231 B1 | 3/2009 | Golgolab et al. | |
| 7,612,963 B2 * | 11/2009 | Allen et al. | 360/123.06 |
| 7,808,743 B2 * | 10/2010 | Matono et al. | 360/125.3 |
| 8,081,401 B1 | 12/2011 | Huang et al. | |
| 8,218,264 B1 | 7/2012 | Sasaki et al. | |
| 8,243,560 B2 | 8/2012 | Araki et al. | |
| 8,270,110 B2 | 9/2012 | Araki et al. | |
| 8,274,757 B2 * | 9/2012 | Matsumoto et al. | 360/123.11 |
| 8,274,759 B1 | 9/2012 | Sasaki et al. | |
| 8,289,649 B2 | 10/2012 | Sasaki et al. | |
| 8,295,008 B1 * | 10/2012 | Sasaki et al. | 360/125.02 |
| 8,300,357 B1 | 10/2012 | Sasaki et al. | |
| 8,345,381 B1 | 1/2013 | Sasaki et al. | |
| 8,345,382 B1 | 1/2013 | Sasaki et al. | |
| 8,385,019 B1 * | 2/2013 | Sasaki et al. | 360/123.03 |
| 8,441,755 B2 * | 5/2013 | Sasaki et al. | 360/123.03 |
| 8,467,150 B2 * | 6/2013 | Takeo et al. | 360/125.3 |
| 2008/0151424 A1 * | 6/2008 | Bedell et al. | 360/123.19 |

OTHER PUBLICATIONS

"Design of a Single-turn Microstrip Write Head for Ultra-high Data Rate Recording," by Jason Jury et al., IEEE Transactions on Magnetics, vol. 35, No. 5, Sep. 1999, pp. 2547-2549.

* cited by examiner

*Primary Examiner* — Mark Blouin
(74) *Attorney, Agent, or Firm* — Saile Ackerman LLC; Stephen B. Ackerman

(57) ABSTRACT

A magnetic write head is fabricated with its driving coil formed as a vertical coil, with a series of spiral turns continuously connected to form a multiple turn helix that fits within even a write head with a short yoke length of approximately 2 microns. The vertical coil shape allows the effects of coil resistance to be decoupled from the number of coil turns so that pole tip protrusion caused by Joule heating can be significantly reduced even if the writing current is increased. The vertical coil shape allows higher frequency writing as well as a reduction in wide area track erasures (WATE).

24 Claims, 5 Drawing Sheets

VERTICAL COIL (VC) DESIGN FOR SHORT YOKE LENGTH PERPENDICULAR MAGNETIC RECORDING (PMR) WRITER

BACKGROUND

1. Technical Field

This disclosure relates to the fabrication of magnetic read/write heads that record at high data rates. More particularly, it relates to such a structure that incorporates a main writing pole that is activated inductively by a vertical coil.

2. Description

With growing demands for cloud storage and cloud-based network computing applications, high and ultra-high data rate recording becomes important for high-end disk drive applications. It is essential to design perpendicular magnetic recording (PMR) writers that can achieve such optimum high data rate performance.

Referring to FIG. 1, there is shown schematically a vertical (x-direction) cross-sectional view (x-z plane) of a PMR writer with a pancake (flat) coil design. The ABS plane of the writer (1) is the x-y plane. The plane of the pancake coil is the y-z plane. The y-axis is the cross-track direction and the x-axis is the down-track direction.

The PMR writer includes a main pole (4), denoted MP, with a small surface area at its tip, which emerges at the ABS plane (1). A trailing shield (6), also denoted PP3, serves to channel the flux that emerges from the main pole and passes through the recording medium back through the writer to complete the induced flux loop. The MP and the PP3 are connected together by a yoke (5), denoted TY. The PP3 is also coupled at its ABS end to a write shield (7), which we will denote as WS, to enhance the flux intensity and shield other portions of the writer from its flux. The magnetic flux that emerges from the MP (4) is generated by a driving coil (3a & 3b). The driving coil is shown in cross-section as three rectangles (3a) on the ABS side of the TY and three rectangles (3b) on the opposite side of the TY. These rectangles are the plane cross-sections through the coil. The driving coil is a horizontal, planar spiral, i.e., a "pancake," with its continuous coil turns being wound about the TY. A bucking coil (2a & 2b), is like a mirror image of the driving coil and is formed beneath the driving coil The driving coil is wound in series with the bucking coil, but is wound in an opposite direction, and the two coils are connected through a connector (8). The purpose of the bucking coil is to minimize the inductive coupling between the current in the coils and PP3. The yoke length of the writer configuration is defined as the distance from the ABS (1) to point A, which is at the inner corner where PP3 (6) joins the TY (5).

Referring next to FIG. 2, there is shown a schematic illustration, in a top view (y-z plane), of the spiral configuration that forms either (3a) and (3b) of FIG. 1. Note that the spiral turns are narrow and compressed at the ABS end (3a), so they can fit within the confines of the writer that is defined by the yoke length. The configuration is denoted as having 3+3 turns, (3+3)T, to indicate the three turns of the driving coil and the three turns of the bucking coil.

For a write head to operate at high speed, three issues must be addressed: intrinsic yoke flux response; write current response and magnetization current response. Short yoke length (SYL) and narrow main pole and yoke width have been identified as key dimensions for improved data rate performance because they can reduce eddy current damping and improve intrinsic yoke flux response. As yoke length is reduced, coil height and width must shrink in order to fit into the reduced available space. As a result of this reduction in coil size, the coil resistance increases. High coil resistance is not desirable as Joule heating of the coil by the write current (Iw) may induce large write pole tip protrusion (IwPTP) caused by thermal expansion. As writing frequency increases, Joule heating also increases in proportion to the frequency. The challenge then becomes: how to reduce coil resistance without any penalty to high data rate performance, or to even gain high data rate performance. These issues have been addressed in various ways by Khizroev et al (U.S. Pat. No. 6,876,518), Wang et al. (U.S. Pat. No. 7,102,854), Shukh et al. (U.S. Pat. No. 6,477,007), Golgolab et al. (U.S. Pat. No. 7,505,231), Huang et al. (U.S. Pat. No. 8,081,401). Additional background material is found in J. Jury et al. "Design of a single turn microstrip write head for ultra-high data rate recording" IEEE Trans. On Magnetics, Vol. 35, No. 5, September 1999. However the approaches advocated in these teachings do not deal with the challenges in the manner to be discussed herein nor do they obtain results that offer such significant improvements.

SUMMARY

The object of this disclosure is to provide a writer design that can significantly increase write speed (i.e. respond better to high frequency current variations) without the corresponding increase of ATE and/or WATE.

A further object of this disclosure is to provide such a writer design wherein write current, Iw, is reduced, so that even an increase in DC coil resistance (DCR) does not imply higher Joule heating.

Still a further object of this disclosure is to provide a writer design in which the problem of thermally induced pole tip protrusion (IwTPTP) due to Joule heating of the write coil is significantly reduced.

These objects will be realized by a vertical coil (VC) design that will replace the pancake, horizontal coil design currently in use. The VC design will achieve the shortest yoke length (YL), approximately 1 to 2 microns, independent of the number of coil turns, thus decoupling the coil turn/DCR limitation that normally would accompany reduction in YL. With the VC design, 2 turn (2T), 3 turn (3T) and even 4 turn (4T) coils can be incorporated within the same (or similar) YL and one can obtain low DCR for high data rate applications at low Iw and OSA (write current overshoot amplitude) and OSD (write current overshoot duration) setting for low IwTPTP and improved WATE. Internal capacitance is increased to slightly reduce DCR and inductance at higher frequencies.

Note that OSA and OSD refer to the operational conditions that when the write current activates the coil, there is a period of time (rise time) within which the current rises appreciably above the value required to write on the recording medium (OSA, overshoot), and then it remains at this overshoot value (OSA) for the OSD (overshoot duration) and then comes back down to the required level for writing. In the examples to be discussed herein, typically OSA/OSD both have the same settings.

DETAILED DESCRIPTION

The application discloses a magnetic writer having a vertical coil and short yoke length that allows the use of lower write currents (Iw) and a corresponding reduction of thermally induced pole tip protrusion (IwTPTP) that results from excessive. Joule heating, and further providing superior high frequency writing and a reduction in WATE.

Ideally, the present horizontal write coil (pancake coil) design would utilize a single turn coil as it can reduce both resistance and inductance. However, such, a design would require a preamplifier of sufficient power to provide the necessary magnetomotive force (MMF) from the coil to the pole structure and such a preamplifier is presently neither practical nor available. Pancake coil designs utilizing two (2T) or three (3T) turns are still the only option for present (and future) PMR heads. For the current pancake design, two turns can achieve a shorter yoke length (YL) and lower resistance than a three turn design because one turn is eliminated. However, two turns still requires more current to be properly driven and a net gain has yet to be realized.

Figure 3:
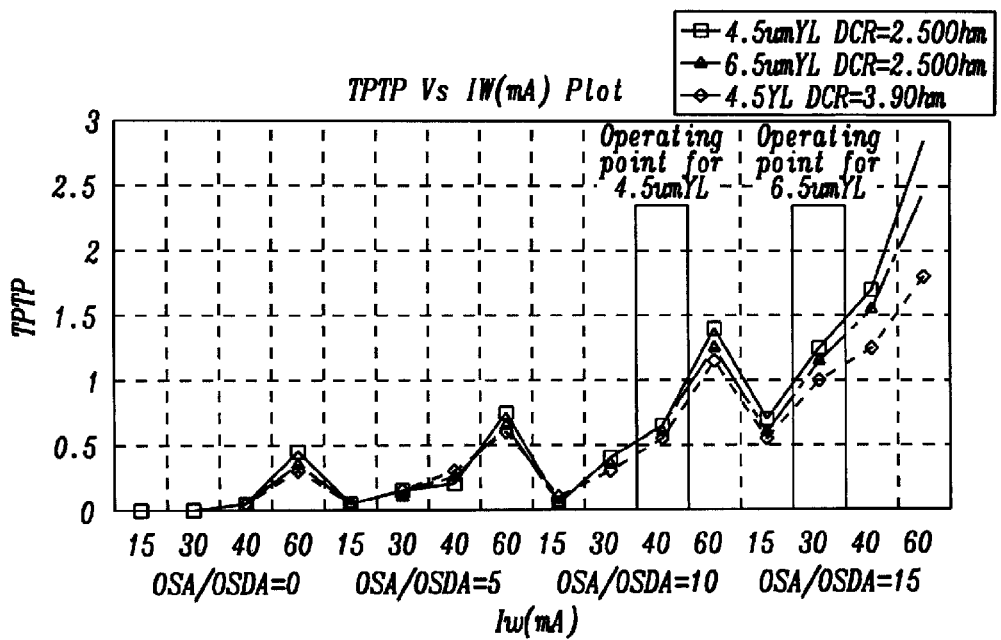
FIG. 3 is a graphical illustration showing the relationship between write current (Iw) and corresponding thermal pole tip protrusion (IwTPTP), at different OSA and OSD settings and for three different values of yoke length (YL) and coil resistance (DCR).
Figure 4:
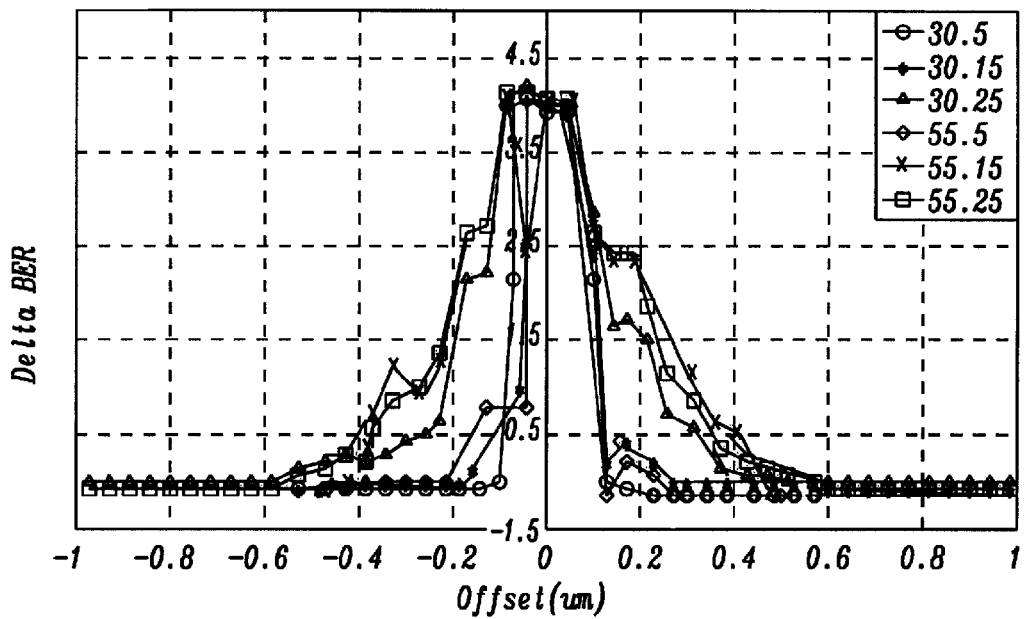
FIG. 4 is an overlay of 6 graphs showing the relationship between WATE and Iw at two different Iw values (30/55) and three different OSA values (5/15/25), with OSD fixed at 25.

Referring to FIG. 3, there is shown a graphical comparison of the IwTPTP vs. Iw of three 3T designs: a 4.5 µm YL with DCR=2.5Ω (diamond shaped points); a 6.5 µm YL with DCR=2.5Ω (triangular shaped points) and a 4.5 µm YL with DCR=3.9Ω (square shaped points). Short YL and low DCR both can help reduce IwTPTP at the same Iw, OSA and OSD settings. A short YL can also make further gains in IwTPTP reduction even with a higher DCR. If a design can move its operating point to further lower Iw (□=30 mA) and OSA and OSD (□=5), then IwTPTP can be negligible even when DC resistance (DCR) is higher. In addition, WATE (wide area track erasures) can also be significantly improved at low Iw and OSA/OSD settings as shown in FIG. 4. Therefore, the key for high data rate applications is to design a head that can achieve good performance at low Iw, OSA and OSD settings along with low DCR. Referring to FIG. 4, there is shown an overlay of six graphs indicating a relationship between WATE and Iw, for two values of Iw (30/55 mA) and three values of OSA (5/15/25) with OSD fixed at 25. The inset legend box identifies the graphs.

Figure 1:
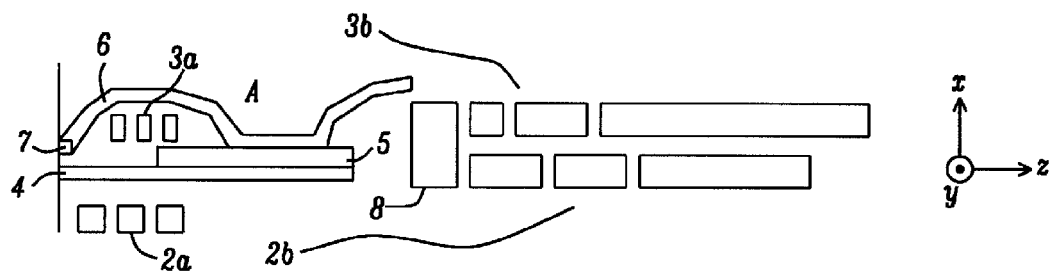
FIG. 1 is a schematic illustration of side cross-sectional view, through a central plane of the main pole, of a present writer design.
Figure 2:
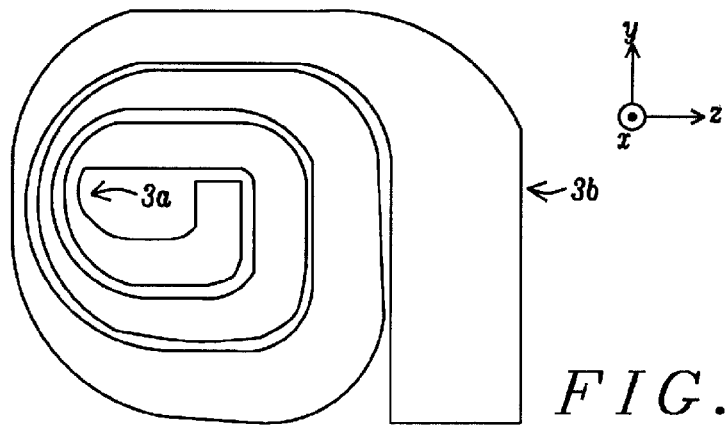
FIG. 2 is a schematic overhead view of a "pancake" spiral coil used in the writer design of FIG. 1.
Figure 5A:
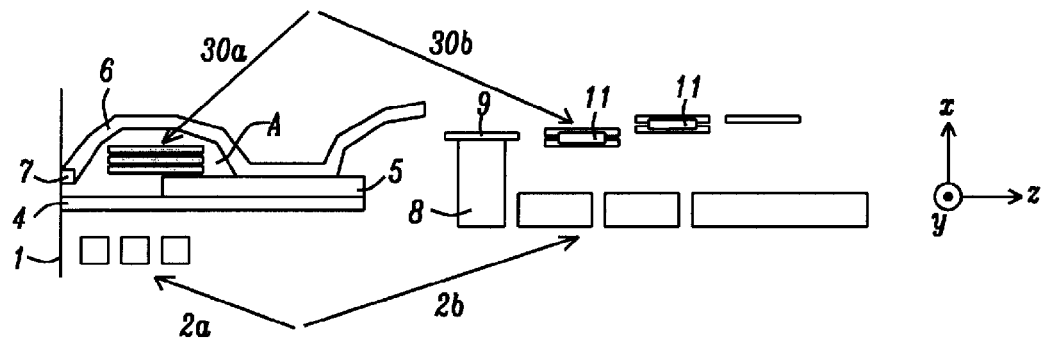
FIG. 5a is a schematic illustration of side cross-sectional view, through a central plane of the main pole, of a writer design that incorporates a vertical coil (VC) with coil 2 only, which will meet the objects of this disclosure.
Figure 5B:
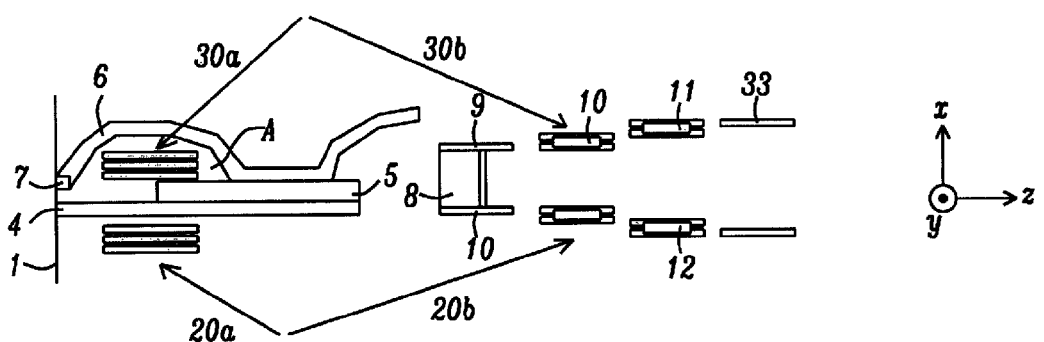
FIG. 5b is a schematic illustration of side cross-sectional view, through a central plane of the main pole, of a writer design that incorporates both a coil 1 and a coil 2 vertical coil (VC) which will meet the objects of this disclosure.

Referring now to FIGS. 5a and 5b, there is shown schematically, in vertical cross-section, two types of vertical coil (VC) designs that will meet the objects of the present disclosure. The similarity between the structural form of these designs (with the exception of the coil design) and that shown in FIG. 1, indicates the ease with which these designs can be fabricated using present fabrication technologies. These two designs are implementations of the basic idea that by stacking a coil vertically, the coil width can be designed to fit the shortest YL that the basic design process can deliver, which is approximately 2 microns (2 µm). A 3T coil can fit within the same parameters of the YL as can a 2T or a 1T coil. Either of these coils can achieve equally good high data rate performance at a low Iw and OSA and OSD setting. Even when coil thickness is reduced, coil resistance can still be kept low by shortening total coil length (total length measured along the coil) and widening coil width of the individual windings in a direction away from the ABS.

Total coil length here means the'distance measured along the coil itself. With VC design, the pitch of the spiral is measured the same way as the yoke length, from ABS end to yoke end, and it can also be significantly reduced.

Coil width here is the width of individual windings. Since there is only one turn at one spiral height, VC coil width can be as wide as the sum of all coil turn widths and spacing between coil turns in a pancake coil design. For VC coil design, the width from side to side in the cross-track direction of the entire spiral has more freedom to be reduced significantly as the entire writer shrinks in cross-track direction to achieve a compact writer for high data rate application. However, cross-track writer protrusion profile is also important for writer touch down detection. Therefore, the coil shape and width needs to take both writer magnetic dimensions and writer mechanical designs in to consideration.

Referring first to FIG. 5a, there is shown schematically a vertical (x-direction) cross-sectional view (x-z plane) of a PMR writer with a three turn (3T) vertical coil design in the driving coil (30a and 30b) and a flat (single horizontal plane) coil design (pancake) for the bucking coil (2a and 2b). The ABS plane of the writer (1) is the x-y plane. The plane of each successive, vertically rising level of the vertical driving coil is the y-z plane. The y-axis is the cross-track direction and the x-axis is the down-track direction.

The PMR writer includes a main pole (4), denoted MP, with a small surface area at its tip, which emerges at the ABS plane (1). A trailing shield (6), shown here as curving over the top of the writer, serves to channel the flux that emerges from the main pole and passes through the recording medium back through the writer to complete the induced flux loop. The MP and the trailing shield are connected together by a yoke (5), denoted TY. The trailing shield (6) is also coupled at its ABS end to a write shield (7), which we will denote as WS, to enhance the flux intensity and shield other portions of the writer from its flux. The magnetic flux that emerges from the MP (4) is generated by a continuous vertical driving coil (30a & 30b). Note, in FIGS. 5a, 5b, 5c and 5d, the coils are indicated by a portion designated "a" (eg. 30a) and a portion designated "b" (eg. 30b), referring to that portion of the vertically layered turns that is contained within the ABS end of the writer (a-portion) beneath the trailing shield (6) and the portion that is behind the yoke (b-portion). The two portions are electrically connected to form the continuous rising spiral and the write current flows continuously through both portions. Note that portion (30a) fits within the opening formed between the overhead curved portion of the trailing shield (6) and a lower base provided by the yoke (5) and the main pole (4). The portion (30a) that fits within this opening is formed as a vertical series of turn layers having either a common horizontal width in the z-direction (as shown in the figures), or whose widths may decrease in the vertical direction to fit within the opening. Note that the structure of a coil will be shown in greater detail in FIG. 6, to follow.

The driving coil (30a) is shown in cross-section as three vertically separated layers, each of these layers being shown as a single rectangle corresponding to a single turn on the ABS side of the yoke (5) and the corresponding horizontally separated and vertically rising layers of rectangles (30b) on the opposite side of the yoke (rear portion).

In the rear portion, which comprises a continuation of the spiral coil (30a), the flat (horizontal plane) coil turns (30b) are connected electrically by vertical connectors (11), that generate the vertical rise of the spiral driving coil, because of the manner in which the spiral is spread out horizontally. These rectangles are the plane cross-sections (in the x-z plane) through the coil layers. The driving coil is, therefore, a series of electrically connected vertically rising layers, each layer being a single turn, and forming a continuous three turn (3T) coil being wound as a vertically rising helix about the yoke TY (5). Note that each of the three turns near the ABS end are shown as having equal width (in the z direction). This is not a necessary restriction. For example, the top layer of the three layers can shrink slightly and the bottom layer can widen slightly, creating a vertical cross-section of pyramidal shape that fits within the space between (6) and the yoke (5).

The minimum thickness of a coil turn can be determined by the maximum allowable current density based on reliability requirements. For a copper (Cu) coil, for example, the limit is approximately $1.5 \times 10^7$ A/cm$^2$. Assuming an operating current of Iw ~60 mA, the smallest cross-sectional area of the coil is ~0.4 µm$^2$. If the smallest coil width is 1 µm, the corresponding thickness could be ~0.4 µm or more. Generally coil thickness is in the range between 0.2 and 1.2 µm. With a TY distance to the ABS of approximately 1.5 to 2 µm and a WS height of between approximately 0.2 and 0.5 µm, the narrowest coil turn width at the MP center location can reach 0.6 to 1.4 µm considering an approximate 0.2 µm spacing from the coil to the WS and to the TY. Since the TY shape does not have to be rectangular, the coil width can increase in the Y plane as long as the 0.2 µm spacing is maintained. The widest coil turn can be any value that takes into consideration the magnetic width of the writer and such mechanical design factors as Iw induced cross-track protrusion profile, which is important for touchdown considerations. Generally, the widest individual coil width is expected to be in the approximate range between approximately 2 and 10 µm.

A bucking coil (2a & 2b), is formed beneath the driving coil. The bucking coil, in this example, is a pancake design and is wound in series with the driving coil, but in an opposite direction, and connects, in the rear, to the driving coil through a single vertical connector (8). The connector is shown here as contacting the lower horizontal turn of the driving coil (9).

The purpose of the bucking coil is to minimize the inductive coupling between the current in the coils and PP3. The yoke length of the writer configuration is defined as the distance from the ABS (1) to point A, which is at the inner corner where PP3 (6) joins the TY (5).

Referring next to FIG. 5b, there is shown schematically a vertical (x-direction) cross-sectional view (x-z plane) of a PMR writer with a three turn (3T) vertical coil design in the driving coil (30a and 30b) as in FIG. 5a and a similar vertical coil design for the bucking coil (20a and 20b). The ABS plane of the writer (1) is the x-y plane. The plane of each level of the vertical coils is the y-z plane. The y-axis is the cross-track direction and the x-axis is the down-track direction. The driving and bucking coils are mirror symmetric about a horizontal plane through the yoke (5).

Identically to the design of FIG. 5a, the PMR writer in FIG. 5b includes a main pole (4), denoted MP, with a small surface area at its tip, which emerges at the ABS plane (1). A trailing shield (6), serves to channel the flux that emerges from the main pole and passes through the recording medium back through the writer to complete the induced flux loop. The MP and the trailing shield are connected together by a yoke (5), denoted TY. The trailing shield is also coupled at its ABS end to a write shield (7), which we will denote as WS, to enhance the flux intensity and shield other portions of the writer from its flux. The magnetic flux that emerges from the MP (4) is generated by a vertical driving coil (30a & 30b). The driving coil is shown in cross-section as three layers (3T coil), each being a single rectangle (30a) corresponding to a single turn, on the ABS side of the TY. There are corresponding vertically rising layers of rectangles (30b) on the opposite side of the TY. These rectangles are the plane cross-sections through the rear portions of the coil layers and they are shown as being connected by vertical conducting connectors, denoted (11) for the driving coil and (12) for the bucking coil. Because the coils are disposed horizontally as a sequence of partial spiral turns, each at a single level, the rise of the vertical helix for the driving coil and the fall of the helix for the bucking coil is provided by the connecting links (11) & (12) respectively. The driving coil is thus a series of vertically rising layers of separate single turns, with the coil being made continuous by the conducting connectors and the resulting coil being wound as a vertically rising spiral about the TY. Note that each of the three turns near the ABS end are shown as having equal width in the z-direction and are vertically aligned. This is not a necessary restriction. For example, the top layer of the three layers can shrink slightly and the bottom layer can widen slightly, creating a vertical cross-section pyramidal shape that fits within the space between the trailing shield and the yoke.

A bucking coil (20a & 20b), is formed beneath the driving coil. The bucking coil is also a vertical coil design and is wound in series with the driving coil, but in an opposite direction, and connects to the driving coil through a connector (8). It may be noted that the bucking coil is essentially a mirror image of the driving coil, the "mirror" being the horizontal plane of the yoke (5). The connector (8) is shown here as contacting the lower turn of the driving coil (9) and the upper turn (10) of the bucking coil. The purpose of bucking coil is to minimize the inductive coupling between the current in the coils and PP3. The yoke length of the writer configuration is defined as the distance from the ABS (1) to point A, which is at the inner corner where trailing shield (6) joins the TY (5).

Figure 5C:
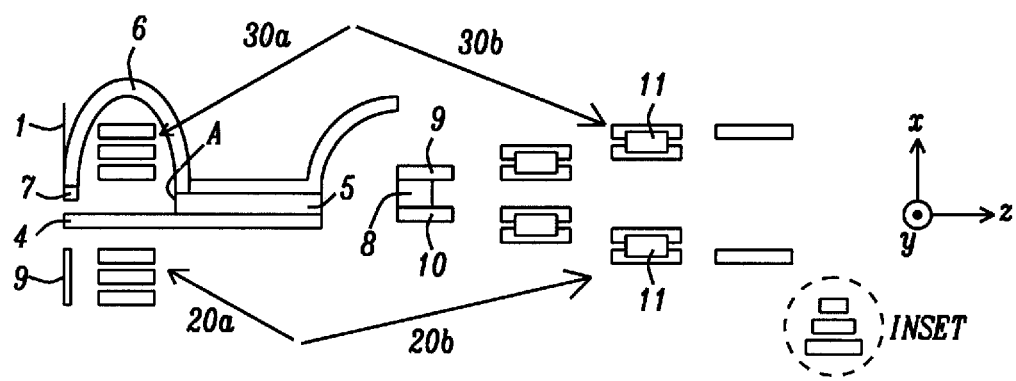
FIG. 5c is a schematic illustration of a side cross-sectional view through a central plane of the main pole, of a writer design that incorporates both a coil 1 and a coil 2 vertical coil (VC) which will meet the objects of this disclosure, especially with YL reduced to be close to TYd (TY distance to ABS). A leading shield (LS) is indicated, but is optional.

Referring next to FIG. 5c, there is shown schematically a vertical (x-direction) cross-sectional view (x-z plane) of a PMR writer with a three turn (3T) vertical coil design for the driving coil (30a and 30b) and a similar vertical coil design for the bucking coil (20a and 20b). The ABS plane of the writer (1) is the x-y plane. The plane of each level of the vertical coil is the y-z plane. The y-axis is the cross-track direction and the x-axis is the down-track direction.

The design of FIG. 5c is otherwise identical to the design of FIG. 5b except that in FIG. 5c the yoke does not extend beyond point A, so the yoke length (distance between A and the ABS (1)) is close to the minimum distance between the end of the yoke (5) and the ABS (1) (minimum distance being denoted TYd) and the drive coil can be placed above the main pole (4) and inserted between the write shield (7) and the TY. This results in a very precise fit of the coils in the opening between the trailing shield (6) and the MP.

The PMR writer includes a main pole (4), denoted MP, with a small surface area at its tip, which emerges at the ABS plane. The trailing shield (6), serves to channel the flux that emerges from the main pole and passes through the recording medium back through the writer to complete the induced flux loop. The MP and the return shield are connected together by the yoke (5), denoted TY. The return shield (6) is also coupled at its ABS end to a write shield (7), which we will denote as WS, to enhance the flux intensity and shield other portions of the writer from its flux. The magnetic flux that emerges from the MP (4) is generated by a vertical driving coil (30a & 30b). The driving coil is shown in cross-section as three layers, each being a single rectangle (30a) corresponding to a single turn, on the ABS side of the TY and corresponding horizontally separated and vertically rising layers of rectangles (30b) on the opposite side of the TY. These rectangles are the plane cross-sections through the coil layers and they are shown as being connected by conducting vertical connectors, (11). Because of the manner in which the coils are disposed horizontally as a sequence of partial spiral turns, each at a single level, the rise of the vertical helix is provided by the vertical connecting links (11). The very first connecting link is shown as (8) and it connects flat coil sections (9) of the upper coil and (10) of the lower coil. The driving coil is thus a series of vertically rising layers, each forming a single turn, with the continuous coil being wound as a vertically rising spiral about the TY and the bucking coil is its mirror image (oppositely wound). Note that each of the three turns near the ABS end is shown as having equal width. This is not a necessary restriction. For example, the top layer of the three layers can shrink slightly and the bottom layer can widen slightly (see INSET), creating a vertical cross-section pyramidal shape that fits within the space between return shield (6) and the yoke (5).

A bucking coil (20a & 20b), is formed as a mirror image beneath the driving coil. The bucking coil is also a vertical coil design and is wound in series with the driving coil, but in an opposite direction. The bucking coil connects to the driving coil through a connector (8). It may be noted that the bucking coil is essentially a mirror image of the driving coil, the "mirror" being the horizontal plane of the yoke (5). The connector (8) is shown here as contacting the lower turn of the driving coil (9) and the upper turn of the bucking coil (10). The purpose of the bucking coil is to minimize the inductive coupling between the current in the coils and PP3. The yoke length (YL) of the writer configuration is defined as the distance from the ABS (1) to point A, which is at the inner corner where the return shield (6) joins the TY (5). With YL reduced close to TYd, the bucking coil is also moved accordingly closer to the ABS. Leading shield (LS) (9) is added in the drawing as an option to contain MP flux to achieve good nearby and far track erasure robustness.

Figure 5D:
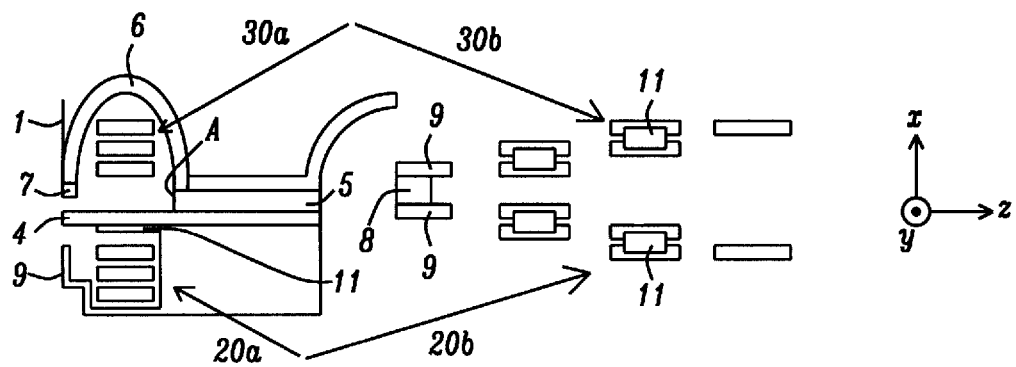
FIG. 5d is a schematic illustration of a side cross-sectional view through a central plane of the main pole, of a writer design that incorporates both a coil 1 and a coil 2 vertical coil (VC) which will meet the objects of this disclosure especially with YL reduced close to TYd (TY distance to ABS). A tapered bottom yoke (tBY) is added to further enhance pole tip saturation speed which is important for HDR applications. With tBY, LS and DWS loop are included to contain flux leakage for tBY and to achieve good near and far track erasure robustness.

Referring next to FIG. 5d, there is shown schematically a vertical (x-direction) cross-sectional view (x-z plane) of a PMR writer with a three turn (3T) vertical coil design in the driving coil (30a and 30b) and a similar vertical coil design for the bucking coil (20a and 20b). The ABS plane of the writer (1) is the x-y plane. The plane of each level of the vertical coil is the y-z plane. The y-axis is the cross-track direction and the x-axis is the down-track direction.

FIG. 5d is virtually identical to FIG. 5c except that a tapered bottom yoke (tBY) (11) on the bottom side of the main pole (4) and DWS (double write shield) loop (111) are added. The PMR writer includes a main pole (4), denoted MP, with a small surface area at its tip, which emerges at the ABS plane. A trailing shield (6), serves to channel the flux that emerges from the main pole and passes through the recording medium back through the writer to complete the induced flux loop. The MP and the trailing shield are connected together by a yoke (5), denoted TY. The trailing shield is also coupled at its ABS end to a write shield (7), which we will denote as WS, to enhance the flux intensity and shield other portions of the writer from its flux. The magnetic flux that emerges from the MP (4) is generated by a vertical driving coil (30a & 30b), denoted here as coil 2. The driving coil is shown in cross-section as three layers, each being a single rectangle (30a) corresponding to a single turn, on the ABS side of the TY and corresponding vertically rising layers of rectangles (30b) on the opposite side of the TY. These rectangles are the plane cross-sections through the coil layers and they are shown as being connected by conducting connectors, (11). Because of the manner in which the coils are disposed horizontally as a sequence of partial spiral turns, each at a single level, with the rise of the vertical helix being provided by the connecting links (11). The driving coil is thus a series of vertically rising horizontal layers of single turns, with the continuous coil being wound as a vertically rising spiral about the TY. Note that each of the three turns near the ABS end are shown as having equal width. This is not a necessary restriction. For example, the top layer of the three layers can shrink slightly and the bottom layer can widen slightly, creating a vertical cross-section pyramidal shape that fits within the space between trailing shield (6) and the yoke.

A bucking coil (20a & 20b), is formed beneath the driving coil. The bucking coil is also a vertical coil design and is wound in series with the driving coil but in an opposite direction, and connects to the driving coil through a connector (8) that connects the bottom turn of the driving coil (9) with the top turn (10) of the bucking coil. It may be noted that the bucking coil is essentially a mirror image of the driving coil, the "mirror" being the horizontal plane of the yoke (5). The connector is shown here as contacting the lower turn of the driving coil (90) and the upper turn of the bucking coil. The purpose of the bucking coil is to minimize the inductive coupling between the current in the coils and PP3. The yoke length (YL) of the writer configuration is defined as the distance from the ABS (1) to point A, which is at the inner corner where trailing shield (6) joins the TY (5). With YL being reduced close to TYd, the driving coil a-portion beneath the trailing shield (6) is also moved accordingly closer to ABS. To further enhance HDR performance to make MP tip saturation at an even lower Iw, a tapered bottom yoke (tBY) is added and contacts the lower side of the main pole. tBY distance to ABS can be reduced to be ~0.5 µm. With the application of the tBY, leading shield (LS) and double write shield (DWS) loop is added in the drawing as an option to contain MP flux to achieve good nearby and far track erasure robustness.

FIGS. 5a to 5d all show a 3T driving coil and 3T bucking coil. Actually, the configurations are not limited to the balanced 3T for vertical coil application. Driving coil can be any one of a 1T, 2T, 3T or 4T design and it can be combined with a bucking coil being any one of 1T, 2T, 3T and 4T etc. . . . For example, unbalanced coil designs with driving coil being 1T or 2T or 4T and bucking coil being 3T; or driving coil being 1T or 3T and bucking coil being 2T. In addition, as shown in FIG. 5c INSET, the cross sectional shape of the driving coil can be pyramidal to fit precisely within the space between the return shield (6) and the pole (4).

Figure 6:
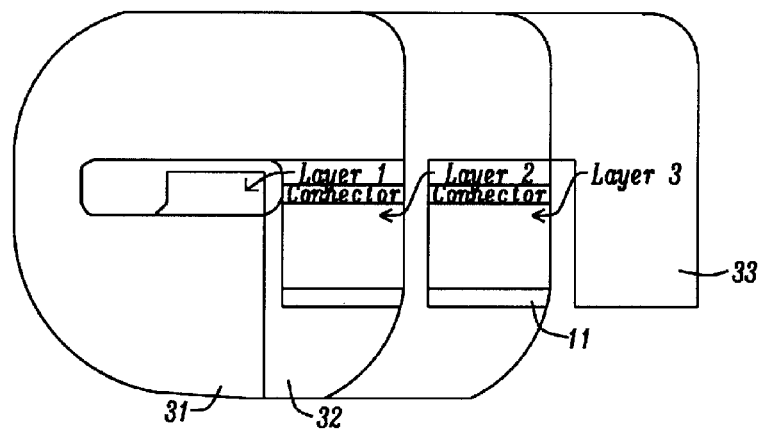
FIG. 6 is a schematic overhead view of a 3T vertical coil design.

Referring to FIG. 6, there is shown schematically an overhead view of a three turn (3 T) vertical coil rising helically. The electrical continuity of the coil and its vertical rise is provided by a conducting connector (11) between each of the three partial spiral turns (sections), (31), (32) and (33), each of which lies on a plane above the others, with (31) being uppermost and (33) being lowermost. The three coils have varying horizontal lengths, with (33) extending furthest to the rear. All three turns overlap vertically and are horizontally aligned at their ABS ends (30a), which is the portion that is formed between the trailing shield and the main pole and yoke.

The 3T vertical design shown in FIG. 6 is one example of a vertical coil design. The coils may be formed using ion-beam deposition (IBD) if their thickness is to be less than 0.3 μm. For greater thicknesses, plating the coils is preferred. As indicated in the figure, each coil turn is a partial spiral. After each turn is deposited, which, if plating is the method of deposition, a seed layer is first deposited, followed by the plated coil segment, followed by a CMP (chemical mechanical polishing) planarization if necessary. Next, a layer of insulation is deposited over the planarized coil. A via is then opened up at the position of the connecting link, i.e. (11) or (8), leading to the vertical level of the next coil segment. A connecting link material is then deposited inside the via. Then, the seed layer deposition, the coil plating and the CMP is repeated. If additional structures are to be formed at the same vertical level as the coil segment, those structures will be formed at that time. The bucking coil is formed first, along with the DWS loop and a leading shield if applicable. This is followed by MP formation (tBY if applicable). For the structure illustrated in FIGS. 5a and 5b, WS and TY can be formed before the driving coil and return shield are finally formed. For the structure illustrated in FIGS. 5c and 5d, it is possible to follow the sequence of steps associated with the fabrications of FIGS. 5a and 5b, to construct WS and TY first and then insert the driving coil into the space between WS and TY or, alternatively, fabricate the first layer of the driving coil first with WS and TY and then form the remaining coil turns of the driving coil. The return shield can be formed as the final step.

Figure 7:
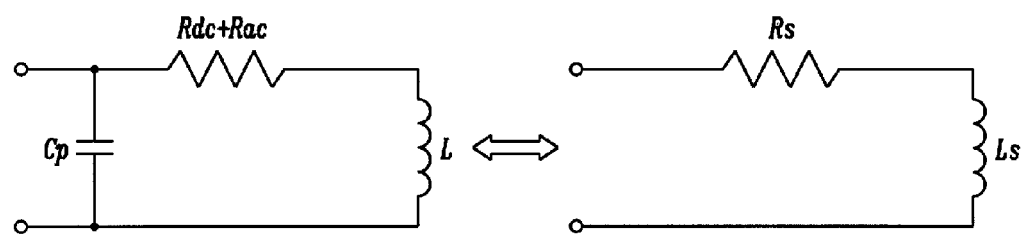
FIG. 7 is schematic illustration of a simple circuit model of a PMR writer and an equivalent circuit describing its behavior when $\omega^2 LC_p \ll 1$.

Referring now to FIG. 7, there is shown schematically a simple circuit model of a PMR writer (left side) and an equivalent circuit model (right side) both under AC operational conditions, with the equivalent circuit being an approximation when $\omega^2 LC_p \square\square 1$, where $\omega=2\pi f$ and f is the operating frequency. Rdc is the DC resistance. Rac can be assumed proportional to the square root of frequency, f. L is the coil inductance and Cp is the coil capacitance.

Figure 8:
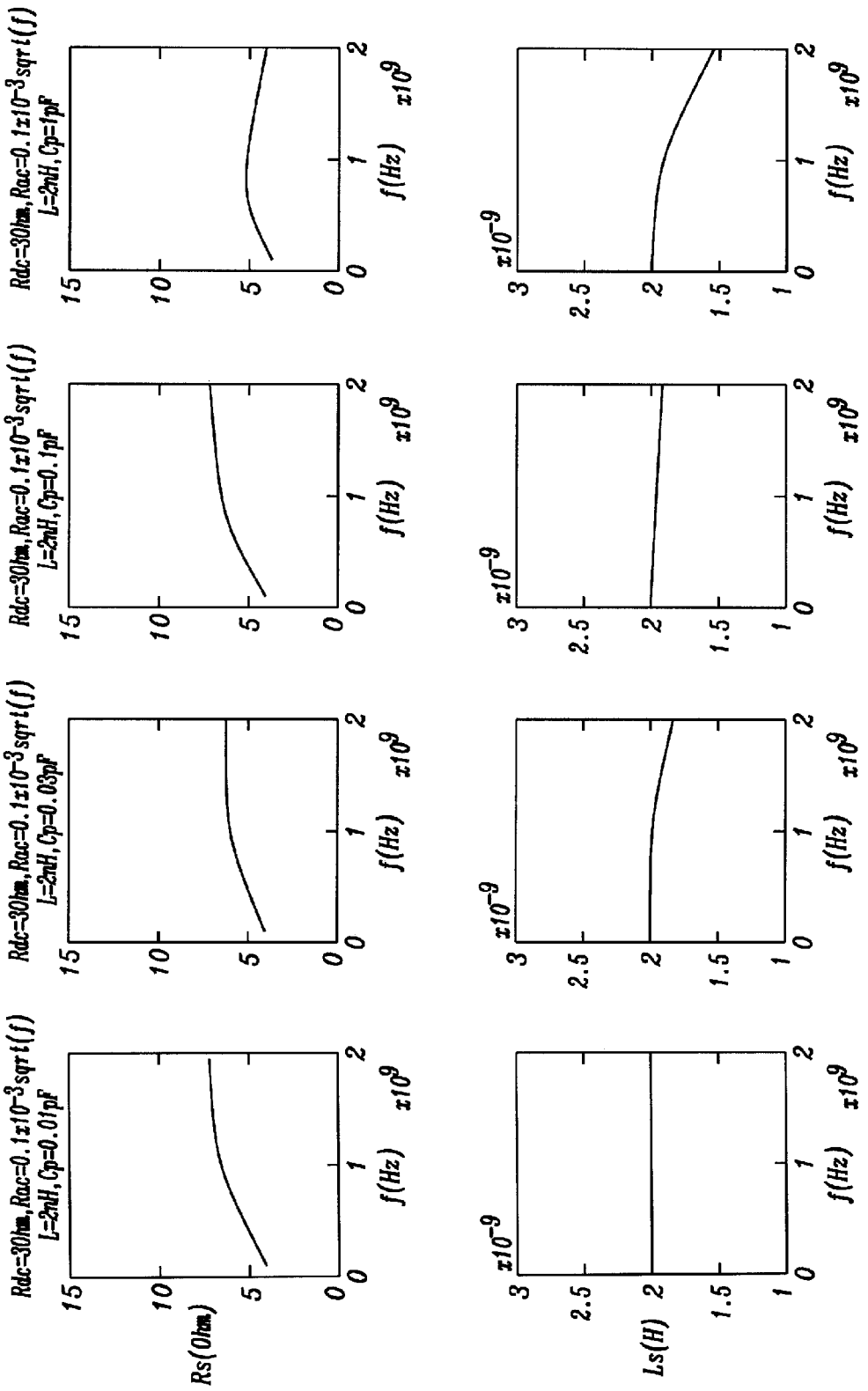
FIG. 8 contains four pairs of graphical simulation results showing the variation in Rs and Ls as a function of frequency f(Hz), up to 2 GHz, when Cp changes from 0.01 pF to 1 pF.

On the assumption that the distance between the two vertical coil layers (driving and bucking) is ~0.1 μm and that the dielectric constant of the insulating material is ~3, then an overlap area between the two coils needs to be ~3770 μm² to obtain a capacitance of 1 pF (picoFarads). Using these and analogous figures and referring to FIG. 8, there are shown four pairs of simulation results of Rs and Ls for frequencies up to 2 GHz (gigahertz) when Cp changes from 0.01 pF to 1.0 pF, assuming that Rdc is 3 ohm, Rac is 0.1 $(f)^{1/2}$ and L=2nH (nanoHenries). From the simulation, if Cp can reach between 0.1 pF and 0.3 pF (picoFarads), i.e. where the overlapping area is between 300 and 1000 μm², the equivalent resistance and inductance, Rs and Ls, can be reduced by between 5% and 15% at 2 GHz.

At 2 GHz, skin depth is ~1.4 μm for copper conductors and ~0.34 μm for $Ni_{50}Fe_{50}$, with $45\times10^{-8}$ OhmMeter resistivity and a relative permeability of 500. Current pancake coil heights range between 0.8 μm and 1.4 μm, which is already less than skin depth. For a vertical coil of the present design, with a coil-to-coil (vertical spacing between overlapping turns) spacing ~0.1 to 0.2 μm and a coil height (thickness of a coil) ~0.2 to 0.3 μm, a total height of the coil in a range between 0.8 to 1.4 μm can be achieved for a 3T coil. For a 2T vertical coil, achieving the height is even easier and can be done even with an increase of coil-to-coil spacing or coil height. A 4T coil is also possible if a coil height on the high side is accepted.

As is understood by a person skilled in the art, the description of the present disclosure is illustrative of the present disclosure rather than limiting of the present disclosure. Revisions and modifications may be made to methods, materials, structures and dimensions employed in forming and providing a magnetic writer with a vertical coil and a shorter yoke length, while still forming and providing such a combination and its method of formation in accord with the spirit and scope of the present disclosure as defined by the appended claims.

What is claimed is:

1. A magnetic write head comprising:
   a main pole having a distal end that terminates in a pole tip at an ABS plane;
   a write shield, a trailing shield and a yoke, magnetically coupled to said main pole and completing a continuous flux circuit when a magnetic recording medium is present, wherein there is a corner point of contact (A) between said trailing shield and said yoke and wherein a yoke length (YL) is defined by a distance between said ABS and said corner point of contact;
   a driving coil situated over said yoke and having a vertically and horizontally aligned portion beneath said trailing shield and fitting vertically between said yoke and said trailing shield, wherein said portion fits horizontally between said ABS and said point of contact and a portion behind said point of contact;
   a bucking coil situated beneath said yoke and beneath said driving coil, wherein said bucking coil is electrically connected, by a vertical connector, in series to said driving coil but wound with an opposite polarity;
   wherein said driving coil is wound as a vertically rising series of sequentially connected horizontal partial spirals, wherein each partial spiral is in a horizontal plane that is vertically separated from other partial spirals and wherein said partial spirals are sequentially connected by vertical conducting links, forming a vertically rising, electrically continuous helical shape wrapping around said yoke as a series of connected rising partial spiral turns; and
   wherein said bucking coil is wound either vertically, as a mirror image helical formation of said driving coil as projected through the horizontal plane of said yoke, or is wound as a "pancake" in a single horizontal spiral formation.

2. The magnetic write head of claim 1 wherein said bucking coil is also formed as a vertical coil.

3. The magnetic write head of claim 2 wherein a portion of said bucking coil is formed vertically beneath said portion of said driving coil formed between PP3 and said yoke and is a mirror image thereof and wherein said portion of said bucking coil is formed vertically below said yoke and above a double write shield (DWS) loop.

4. The magnetic write head of claim 1 wherein overlap between said driving coil and said bucking coil introduces an effective capacitance to circuit parameters of said write head whereby circuit inductance and resistance of said write head are offset at high frequencies.

5. The magnetic write head of claim 1 wherein said driving coil is formed as a three turn coil having a series of three rising partial spiral turns.

6. The magnetic write head of claim 1 wherein said driving coil is formed with at least three turns.

7. The magnetic write head of claim 4 wherein dimensions of each of said turns are adjusted so that said coil fits in a space between said PP3 and said yoke.

8. The magnetic write head of claim 1 wherein said yoke length is between approximately 1 and 2 microns.

9. The magnetic write head of claim 1 wherein a vertical distance between vertical coils of said driving coil and said bucking coil is between approximately 0.1 and 0.3 microns.

10. The magnetic write head of claim 1 wherein said coil 1 and coil 2 are encased in dielectric material having a dielectric constant between approximately 2 and 5.

11. The magnetic write head of claim 1 wherein a write current, an OSA and OSD are minimized to achieve high data rate performance, high frequency writing, improved performance in ATE/WATE and IwTPTP.

12. The magnetic write head of claim 1 wherein equivalent resistance and inductance are reduced by between 5% and 15% at 2 GHz.

13. The magnetic write head of claim 4 wherein a coil-to-coil spacing is between approximately 0.1 and 0.2 μm and wherein a coil height is between approximately 0.2 and 0.3 μm, whereby a total coil height between approximately 0.8 and 0.14 μm is attained.

14. The magnetic write head of claim 1 further including a leading edge shield.

15. The magnetic write head of claim 1 wherein said yoke is a tapered yoke.

16. The magnetic write head of claim 1 wherein coil thickness is in the range between approximately 0.2 and 1.2 μm.

17. The magnetic write head of claim 1 wherein a horizontal distance between said ABS and said top yoke is between approximately 1.5 and 2.0 μm.

18. The magnetic write head of claim 1 wherein said yoke is shortened so that the distance between the end of the yoke nearest the ABS and the ABS is the same as the distance between point A and the ABS.

19. The magnetic write head of claim 1 including a tapered bottom yoke formed beneath said main pole and a double write shield (DWS) loop formed beneath said bucking coil, enclosing the vertically aligned turns of said bucking coil adjacent to said ABS.

20. The magnetic write head of claim 1 wherein the number of turns of said driving coil is 2, 3 or 4 and the number of turns of said bucking coil is 1, 2, 3 or 4, wherein the number of turns may be equal or not equal.

21. A method of fabricating a magnetic write head, comprising:
   providing a substrate;
   forming on said substrate a pair of mirror image vertical coils, having opposite polarities, wherein each coil has a helical geometrical form, said formation further comprising:
      depositing a lower coil as a sequence of planar partial spirals using a method of ion-beam deposition or a method of plating;
      forming a first layer of insulation over each said partial spiral;
      forming a vertical, connecting, conducting link between each pair of successive partial spirals by means of a conductor-filled via formed through said first layer of insulation; then
   forming a main pole and yoke over said lower coil; and
   depositing a second layer of insulation over said main pole and yoke; then
   forming an upper vertical coil over said second layer of insulation, said formation comprising:
      forming a via through said second layer of insulation;
      depositing an upper coil on said second layer of insulation as a sequence of planar partial spirals using a method of ion-beam deposition or a method of plating;
      forming a third layer of insulation between successive partial spirals;
      forming a vertical, connecting, conducting link between each pair of successive partial spirals by means of a conductor-filled via formed through said layer of insulation; then
      electrically connecting said upper and said lower coils by means of an said via formed through second layer of insulation; and
   forming a trailing shield over said upper vertical coil, wherein said trailing shield extends from an ABS to said yoke.

22. The method of claim 20 wherein said upper and lower coils are each formed of 3 partial spirals.

23. The method of claim 20 wherein each partial spiral is formed to a thickness of less than 0.3 μm by a method of ion-beam deposition.

24. The method of claim 20 wherein each partial spiral is formed to a thickness greater than 0.3 μm by a method of plating.

* * * * *